April 2, 1946.  W. B. DUNLAP, JR  2,397,652
UNDERREAMER
Filed Feb. 3, 1944   3 Sheets-Sheet 3
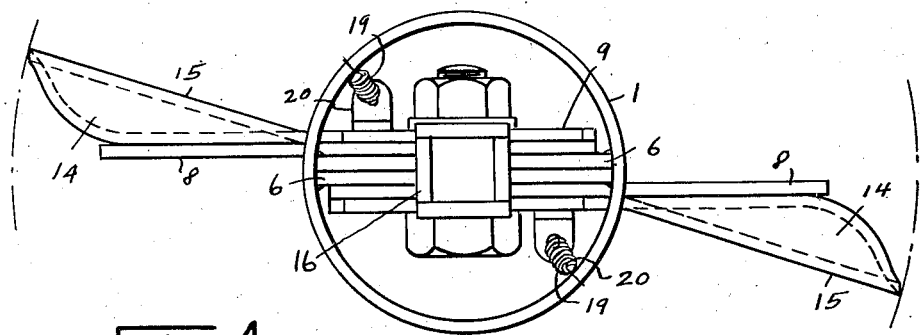
Fig.4.
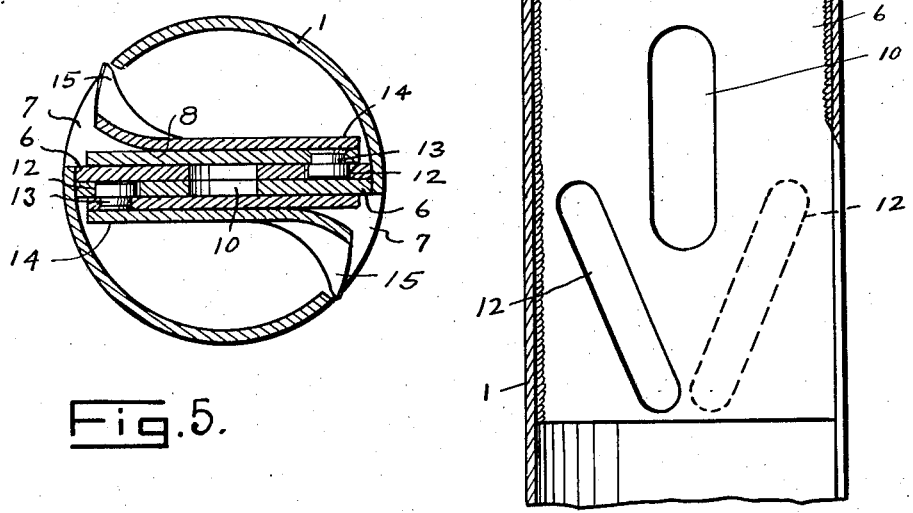
Fig.5.
Fig.7.
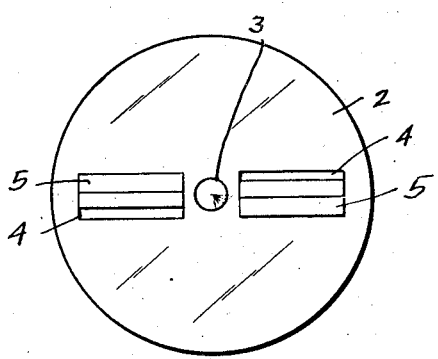
Fig.6.
Inventor
Weyman B. Dunlap Jr.
By
E. V. Hardway
Attorney Patented Apr. 2, 1946

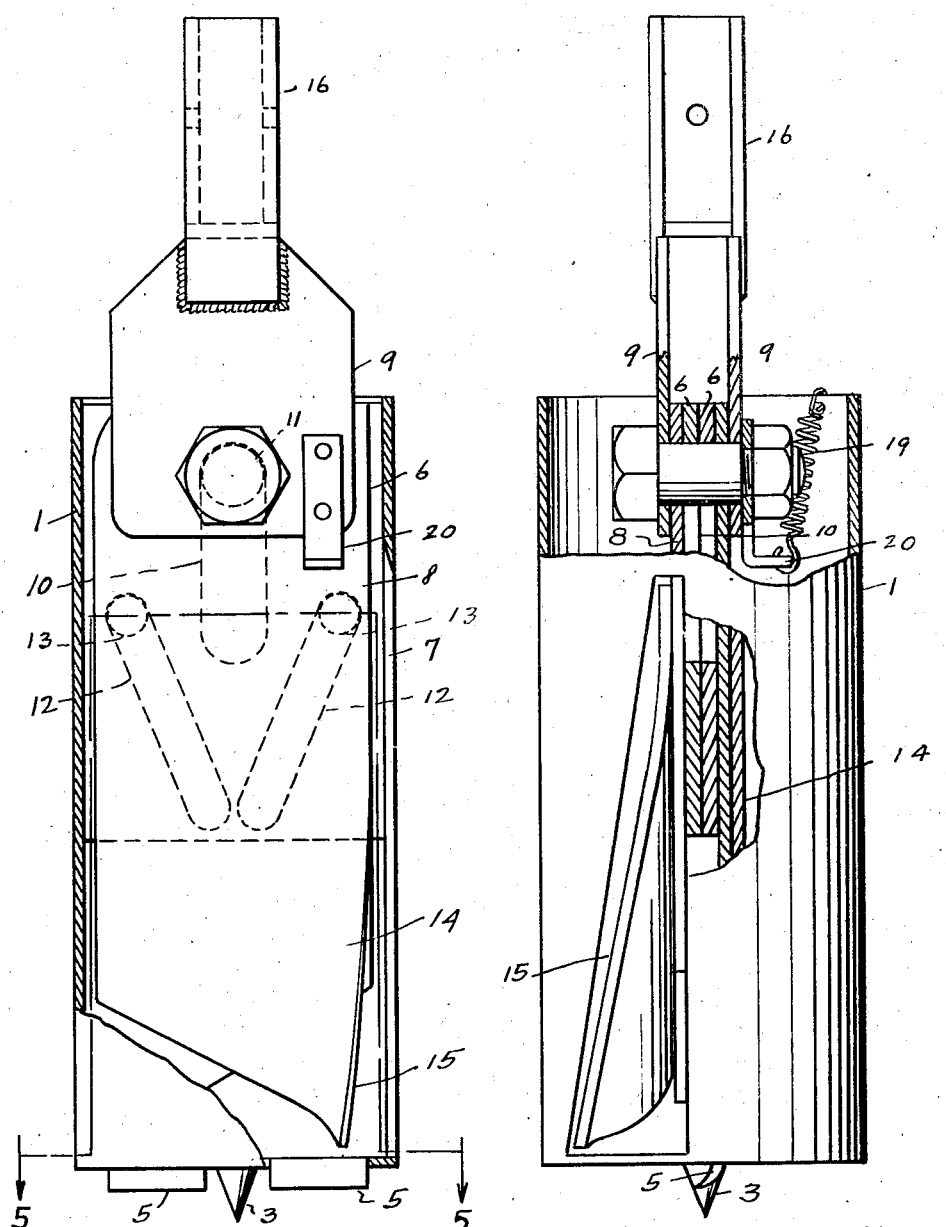

2,397,652

UNITED STATES PATENT OFFICE 2,397,652

UNDERREAMER

Weyman B. Dunlap, Jr., Houston, Tex.

Application February 3, 1944, Serial No. 520,888

1 Claim. (Cl. 255—76)

This invention relates to an underreamer.

An object of the invention is to provide an underreamer specially designed for underreaming, or enlarging, the lower ends of holes, or bores, for receiving foundation piers, piling and the like.

It is another object of the invention to provide an underreamer shaped to be readily lowered into a hole or bore previously formed and having outwardly movable blades, or cutters, whereby the lower end of the bore may be gradually enlarged to the desired extent, said blades being retractable to permit the ready withdrawal of the underreamer from the bore, or hole. The underreamed bore may then be filled with plastic, concretious material which, when set, will have a relatively large supporting base.

The invention also embodies novel means for expanding, or retracting, the reaming blades, or cutters.

Another object of the invention is to provide an underreamer having a substantially cylindrical container, or bucket, having a lower end plate and having side slots through which the reaming blades work, said blades being shaped to gradually move the cuttings inwardly, as the underreamer is rotated, to collect the cuttings within the container or bucket, and, upon retraction of the reaming blades to close said slide slots and retain the cuttings within the container upon withdrawal of the underreamer. The invention also embodies novel means for centering the underreamer in the bore during the rotation or operation thereof as well as means for collecting, into the bucket, the loose earth that may be at the bottom of the bore.

The invention also embodies novel guide means for accurately guiding the reaming blades.

It is a further object of the invention to provide means for holding the retainer firmly against the bottom of the bore while the reaming blades are being retracted.

With the above and other objects in view the invention has particular relation to certain novel features of construction, operation and arrangement of parts, an example of which is given in this specification and illustrated in the accompanying drawings, wherein:

Figure 1 shows a side elevation of the underreamer, partly in section, showing the reamer blades retracted.

Figure 2 shows a side elevational view, partly in section, taken at right angles to the view shown in Figure 1.

Figure 4 shows a top plan view, showing the reaming blades in active position.

Figure 5 shows a cross-sectional view taken on the line 5—5 of Figure 1.

Figure 6 shows a lower end view, and

Figure 7 shows a fragmentary, vertical, sectional view of the bucket.

Figure 3:
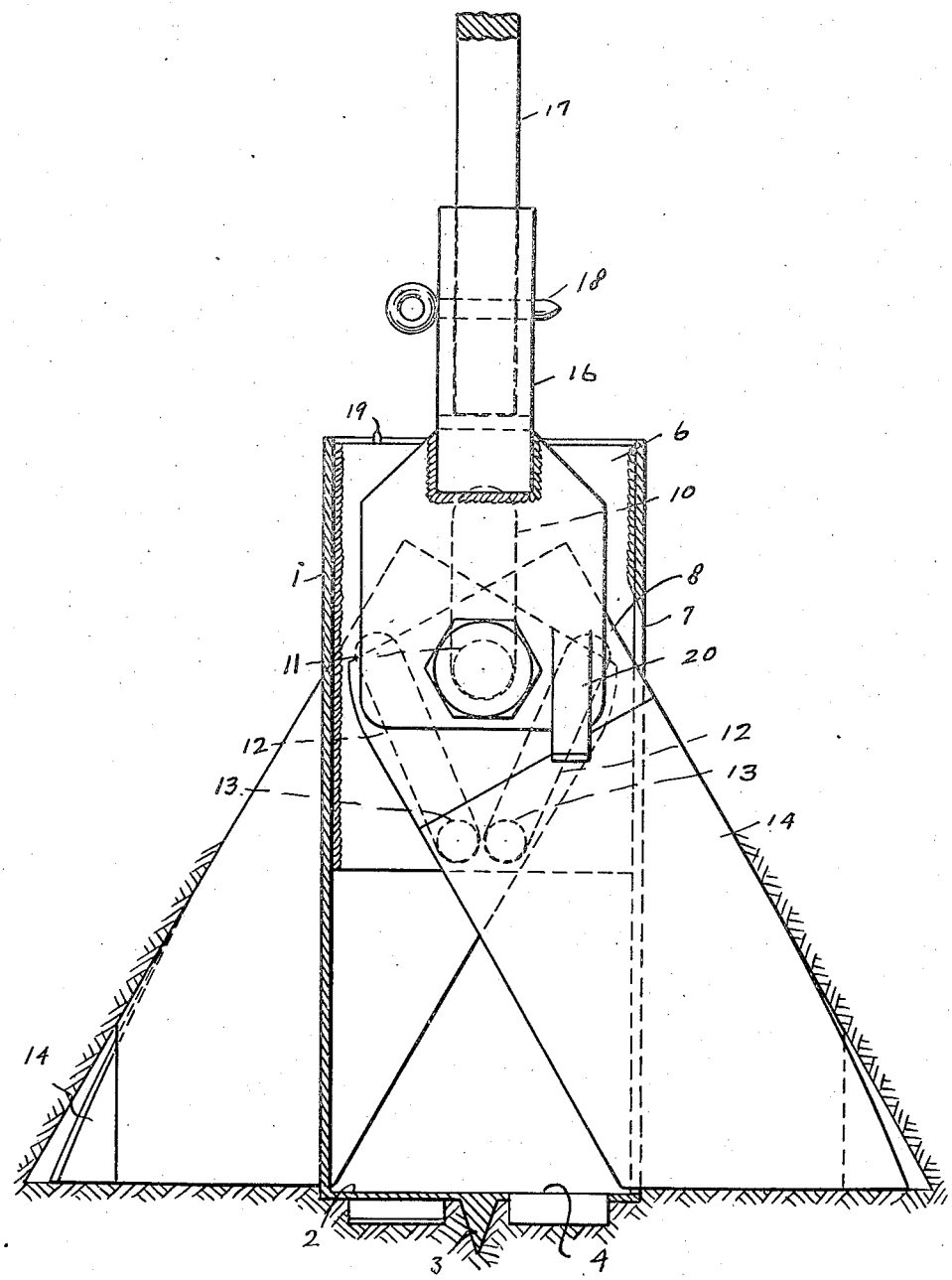
Figure 3 shows a vertical, sectional view showing the reaming blades in expanded, or active, position.

Referring now more particularly to the drawings wherein like numerals of reference designate the same parts in each of the figures, the numeral 1 designates a container, or bucket, preferably cylindrical in shape and whose lower end has attached thereto the lower end plate, or bottom, 2, having the central pilot 3 which is of an inverted, conical shape. On opposite sides of the pilot the lower end of the bucket has approximately radial slots 4, 4 and behind them the scrapers 5, 5, which are forwardly pitched so as to gather the loose earth on the bottom of the bore and direct it through the slots 4 into the bucket, or container, 1.

At the upper end of the bucket there are the transverse adjacent plates 6, 6, which extend a selected distance down into the bucket and whose margins may be secured to the walls of the bucket in any preferred manner as by welding.

On one side of the plates 6, 6 there is one side slot 7, and on the other side of the plates 6, 6, there is another side slot 7. These slots are vertical and are cut through the wall of the bucket and are diametrically opposite and extend from near the upper end of the bucket downwardly to the lower end thereof.

On opposite sides of the fixed plates 6, 6 are the reinforcing plates 8, 8 whose upper ends are embraced by the plate-like jaws 9, 9. The fixed plates 6, 6 have a vertical bearing slot 10, at their upper ends and a clamp bolt 11 is fitted through aligned bearings in the overlapping ends of the plates 8 and jaws 9 and is fitted also through the slot 10 as more clearly shown in Figure 2. The assembly formed of the plates 6, 6 has the upwardly diverging grooves 12, 12 on opposite sides to receive the guide studs 13, 13 which are anchored to the corresponding plates 8, 8. There are the plate-like blades 14, 14 which are fastened, in any preferred manner, as by welding, to the forward sides of the corresponding reinforcing plates 8, 8. The outer margins of the blades 14 are forwardly curved, as more accurately shown in Figures 4 and 5 and terminate in the scraping or reaming edges 15, 15. The curvature of said blades at their lower ends is such that when the blades are in retracted position they will substantially close the slots 7 at their lower ends as indicated in Figure 5 so as to retain the cuttings in the container, or bucket, 1.

The upper ends of the plate-like jaws 9, 9 are secured, preferably by welding, to the lower end of the upstanding driving socket member 16 which is preferably square in horizontal cross-section. It is provided to receive the correspondingly shaped lower end of a driving stem 17 which may be retained therein by means of the cross-pin 18 fitted through the socket member and the driving stem as shown in Figure 3.

Strong coil springs 19, 19 are attached at one end to the upper end of the bucket and at their other ends to the brackets 20, 20 carried by the lower ends of the jaws 9, 9.

In operation the blades will be in retracted position within the bucket 1 as shown in Figures 1 and 2 when lowered into the hole 19. When the underreamer lands on the bottom of the hole the pilot 3 will penetrate into the formation and will hold the bucket centered during rotation. The driving stem 17 may then be rotated in an appropriate direction and by any suitable mechanism provided for the purpose. The downward thrust of the driving stem will tend to move the plates 8 and blades 14 downwardly, the clamp bolt 11 moving downwardly in the slot 10. During this downward movement of the plates, the blades will also be gradually expanded, that is, their lower ends will be moved radially outwardly due to the pins, or studs, 13 engaging in the downwardly diverging grooves 12, 12, in the plate assembly 6, 6, said blades moving outwardly through the slots 7 and finally reaching their extreme outer position as shown in Figure 3.

As the blades move outwardly they will also gradually move downwardly so that their lower ends move, or thrust, outwardly in a horizontal direction to the end that the lower end of the bore, when underreamed, will lie in an approximately horizontal plane as shown in Figure 3. To accomplish this the lower ends of the blades 14 are cut on the diagonal, as shown in Figures 1 and 2, and terminate in sharp cutting edges. As the underreamer is rotated the blades will come into cutting contact with the sides of the hole and the formation will be gradually reamed away from the side walls at the bottom as the blades are progressively expanded. The forward curvature of the blades will gradually force the cuttings inwardly through the side slots 7 and when the upper ends of the grooves 12 engage the pins or studs 13 the blades will be fully expanded and the underreaming of the bore will be fully accomplished. The range of outward movement of the blades and the consequent enlargement of the bore may be determined by the length of the slots 10, and grooves 12 and the size of the blades. As the blades are moved downward and outwardly the springs 19, 19 will be placed under tension.

Thereupon the underreamer may be lifted out of the bore by an upward pull on the driving stem 17. This will operate first to retract the blades inwardly but the tension of said springs will hold the lower end of the bucket firmly against the bottom of the bore while the blades are being withdrawn so that the loose earth will be drawn into the bucket rather than underneath it. When the clamp bolt 11 reaches the upper end of the slot 10, the entire tool will then be moved upwardly and may be completely withdrawn from the bore. The slots 4, being narrow, the earth in the bucket will bridge over them and not fall out. When the tool reaches the ground surface the driving stem may again be lowered thus moving the blades outwardly and rendering the interior of the bucket accessible so that the contents thereof may be discharged.

The drawings and description are illustrative merely, while the broad principle of the invention will be defined by the appended claim.

What I claim is:

An underreamer comprising a cylindrical bucket having side slots, a transverse supporting plate assembly anchored in the top of the bucket and having a vertical slot extending transversely therethrough and upwardly diverging side grooves on opposite sides of the assembly, plate-like reamers aligned with said side slots and having studs, which work in said grooves, driving means, a bolt working through said vertical slot and forming a pivoted connection between the driving means and reamers whereby the downward movement of the driving means relative to said supporting plate will cause the outward movement of the lower ends of the reamers through said side slots.

WEYMAN B. DUNLAP, Jr.